United States Patent
Kottapalli et al.

(10) Patent No.: US 8,819,684 B2
(45) Date of Patent: *Aug. 26, 2014

(54) SYNCHRONIZING MULTIPLE THREADS EFFICIENTLY

(71) Applicant: Intel Corporation, Santa Clara, CA (US)

(72) Inventors: Sailesh Kottapalli, San Jose, CA (US); John H. Crawford, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,777

(22) Filed: Jun. 7, 2013

(65) Prior Publication Data

US 2013/0275995 A1    Oct. 17, 2013

Related U.S. Application Data

(63) Continuation of application No. 13/069,684, filed on Mar. 23, 2011, now Pat. No. 8,473,963, which is a continuation of application No. 11/026,207, filed on Dec. 29, 2004, now Pat. No. 7,937,709.

(51) Int. Cl.
*G06F 9/46* (2006.01)
*G06F 12/00* (2006.01)
*G06F 12/08* (2006.01)
*G06F 9/52* (2006.01)

(52) U.S. Cl.
CPC .............. *G06F 9/52* (2013.01); *G06F 12/0842* (2013.01); *G06F 12/084* (2013.01); *G06F 12/0857* (2013.01)
USPC ............ 718/100; 718/106; 711/113; 711/118

(58) Field of Classification Search
None
See application file for complete search history.

(56) References Cited

U.S. PATENT DOCUMENTS

| | | | |
|---|---|---|---|
| 4,926,375 A | | 5/1990 | Mercer et al. |
| 5,430,850 A | | 7/1995 | Papadopoulos et al. |
| 5,448,732 A | | 9/1995 | Matsumoto |
| 5,535,393 A | | 7/1996 | Reeve et al. |
| 5,611,070 A | | 3/1997 | Heidelberger et al. |
| 5,745,778 A | | 4/1998 | Alfieri |
| 5,790,804 A | * | 8/1998 | Osborne ........................ 709/245 |
| 5,822,764 A | | 10/1998 | Hardage et al. |
| 5,872,963 A | | 2/1999 | Bitar et al. |
| 5,893,097 A | | 4/1999 | Hayata et al. |

(Continued)

OTHER PUBLICATIONS

The Patent Office of the State Intellectual Property Office of the People's Republic of China, Notice on Office Action dated Aug. 10, 2007, with English language translation.

(Continued)

*Primary Examiner* — Emerson Puente
*Assistant Examiner* — Adam Lee
(74) *Attorney, Agent, or Firm* — Trop, Pruner & Hu, P.C.

(57) ABSTRACT

In one embodiment, the present invention includes a method of assigning a location within a shared variable for each of multiple threads and writing a value to a corresponding location to indicate that the corresponding thread has reached a barrier. In such manner, when all the threads have reached the barrier, synchronization is established. In some embodiments, the shared variable may be stored in a cache accessible by the multiple threads. Other embodiments are described and claimed.

13 Claims, 5 Drawing Sheets

(56) References Cited

U.S. PATENT DOCUMENTS

| | | | |
|---|---|---|---|
| 5,926,835 A | 7/1999 | Guidot et al. | |
| 5,991,845 A | 11/1999 | Bohannon et al. | |
| 6,009,426 A | 12/1999 | Jouenne et al. | |
| 6,058,460 A | 5/2000 | Nakhimovsky | |
| 6,134,594 A | 10/2000 | Helland et al. | |
| 6,167,423 A | 12/2000 | Chopra et al. | |
| 6,243,788 B1 | 6/2001 | Franke et al. | |
| 6,289,410 B1 | 9/2001 | Cummins | |
| 6,370,625 B1 | 4/2002 | Carmean et al. | |
| 6,463,527 B1 | 10/2002 | Vishkin | |
| 6,470,424 B1* | 10/2002 | Adams | 711/133 |
| 6,535,905 B1 | 3/2003 | Kalafatis et al. | |
| 6,539,501 B1 | 3/2003 | Edwards | |
| 6,542,991 B1 | 4/2003 | Joy et al. | |
| 6,671,707 B1 | 12/2003 | Hudson et al. | |
| 6,708,256 B2 | 3/2004 | Zahir | |
| 6,795,845 B2 | 9/2004 | Kalafatis et al. | |
| 6,795,901 B1 | 9/2004 | Florek et al. | |
| 7,191,294 B2 | 3/2007 | Nakamura et al. | |
| 7,360,217 B2 | 4/2008 | Melvin et al. | |
| 7,380,066 B2 | 5/2008 | Archambault et al. | |
| 7,512,950 B1 | 3/2009 | Marejka | |
| 2002/0010836 A1 | 1/2002 | Barroso et al. | |
| 2002/0032831 A1 | 3/2002 | Saulsbury et al. | |
| 2002/0046324 A1 | 4/2002 | Barroso et al. | |
| 2002/0060685 A1 | 5/2002 | Handley et al. | |
| 2002/0078122 A1 | 6/2002 | Joy et al. | |
| 2002/0091909 A1 | 7/2002 | Nakanishi | |
| 2002/0095453 A1 | 7/2002 | Steensgaard | |
| 2002/0124205 A1 | 9/2002 | Grey et al. | |
| 2002/0138717 A1 | 9/2002 | Joy et al. | |
| 2002/0147760 A1 | 10/2002 | Torii | |
| 2003/0005223 A1* | 1/2003 | Coulson et al. | 711/118 |
| 2003/0005262 A1 | 1/2003 | Kottapalli et al. | |
| 2003/0014602 A1 | 1/2003 | Shibayama et al. | |
| 2003/0018691 A1 | 1/2003 | Bono | |
| 2003/0061394 A1 | 3/2003 | Buch | |
| 2003/0088608 A1 | 5/2003 | McDonald | |
| 2003/0088610 A1 | 5/2003 | Kohn et al. | |
| 2003/0115476 A1 | 6/2003 | McKee | |
| 2003/0135711 A1 | 7/2003 | Shoemaker et al. | |
| 2003/0191927 A1 | 10/2003 | Joy et al. | |
| 2003/0225816 A1 | 12/2003 | Morrow et al. | |
| 2003/0229740 A1 | 12/2003 | Maly et al. | |
| 2004/0078795 A1 | 4/2004 | Alverson et al. | |
| 2004/0083341 A1* | 4/2004 | Robinson et al. | 711/133 |
| 2004/0168030 A1* | 8/2004 | Traversat et al. | 711/133 |
| 2004/0187118 A1 | 9/2004 | Blainey et al. | |
| 2005/0050374 A1 | 3/2005 | Nakamura et al. | |
| 2005/0102465 A1* | 5/2005 | Royer | 711/1 |
| 2005/0132144 A1* | 6/2005 | Illikkal et al. | 711/145 |
| 2005/0216659 A1 | 9/2005 | Ogawa et al. | |
| 2006/0080398 A1 | 4/2006 | Hoover et al. | |
| 2006/0117147 A1* | 6/2006 | Blinick et al. | 711/145 |

OTHER PUBLICATIONS

The Patent Office of the State Intellectual Property Office of the People's Republic of China, Second Office Action dated Aug. 22, 2008, with English language translation.

The Patent Office of the State Intellectual Property Office of the People's Republic of China, Third Office Action dated May 8, 2009, in a related application.

E.I. Compendex No: 1991030082385 High Speed Synchronization of Processors Using Fuzzy Barriers, Gupta, Rajiv, Univ of Pittsburgh, United States International Journal of Parallel Programming (Int J Parallel Program) 1990 19/1 (53-73) Publication Date Dec. 1, 1990.

Gale Group PROMT(R) (c) 2009, Gale/Cenage; Supplier No. 93792719 Mastering Concurrency: Correctly Implementing Concurrency in Computer Software is Vital for Accurate Computational Modeling, and for the Saftey and Reliability of Embedded Control Systems, (IT). Moores, Jim. Nuclear Engineering Intterational, v 47, n 579, p. 39(1), Oct. 2002.

* cited by examiner

SYNCHRONIZING MULTIPLE THREADS EFFICIENTLY

This application is a continuation of U.S. patent application Ser. No. 13/069,684, filed Mar. 23, 2011, which is a continuation of U.S. patent application Ser. No. 11/026,207, filed Dec. 29, 2004, now U.S. Pat. No. 7,937,709, issued May 3, 2011, the content of which is hereby incorporated by reference.

BACKGROUND

The present invention relates to computer systems, and more particularly to such systems executing multiple threads.

Computer systems including multiprocessor (MP) and single processor systems may include a plurality of "threads," each of which executes program instructions independently from other threads. Use of multiple processors allows various tasks or functions, and even multiple applications, to be handled more efficiently and with greater speed. Utilizing multiple threads or processors means that two or more processors or threads can share the same data stored within the system. However, care must be taken to maintain memory ordering when sharing data.

For data consistency purposes, if multiple threads or processors desire to read, modify, and write to a single memory location, the multiple agents should not be allowed to perform operations on the data simultaneously. Further complicating the use of multiple processors is that data is often is stored in a cache associated with a processor. Because such caches are typically localized to a specific processor, multiple caches in a multiprocessor computer system can contain different copies of a given data item. Any agent accessing this data should receive a valid or updated (i.e., latest) data value, and data being written from the cache back into memory must be the current data so that cache coherency is maintained.

Memory instruction processing acts in accordance with a target instruction set architecture (ISA) memory order model. For reference, Intel Corporation's two main ISAs: Intel® architecture (IA-32 or x86) and Intel's ITANIUM® processor family (IPF) have very different memory order models. In IA-32, load (i.e., read) and store (i.e., write) operations must be visible in program order, while in the IPF architecture, they do not in general. Further, while executing multiple threads in a chip multiprocessor (CMP) or other MP system, ordered memory instructions are used in synchronization and communication between different threads.

Multithreaded (MT) software uses different mechanisms to interact and coordinate between different threads. Two common forms of MP synchronization are barriers and semaphore spin-locks. A barrier mechanism helps a program synchronize different threads at predefined points in the program. Typically, each thread either increments or decrements a memory variable in an atomic fashion when it reaches such a point. Every thread then waits for the memory variable to reach a predetermined barrier level. Synchronization is achieved once all threads have completed the updates. When the barrier is reached, all threads can then proceed.

A semaphore spin-lock mechanism is used to guarantee mutual exclusion across multiple threads while accessing a shared memory variable or structure (i.e., a shared element). In order to provide a unique and consistent view of the shared element, it is guarded by a lock variable. Every thread needing access to the shared element must acquire the guarding lock (i.e., locking) via an atomic semaphore operation. When a lock is acquired, the remaining threads can only acquire the lock after it is released (i.e., unlocking) by the original requester. Only the thread that acquired the lock performs operations/updates on the shared element (software convention), thus mutual exclusion is ensured. Locking is performed by designating a particular value to represent a locked state, and a different value to represent an unlocked state. Each thread seeking to access the shared element acquires the lock by updating the lock variable atomically to the lock value (after possibly checking that the lock has not already been acquired).

Most ISA's provide specific semaphore instructions to achieve MP synchronization between multiple threads or processors. Among these, an atomic-add is a popular instruction for a barrier synchronization mechanism. However, known barrier synchronization methods and semaphore spin-locks cause inefficiencies. Barrier mechanisms typically require significant traffic, such as inter-processor cache traffic, as the lock variable moves to different cores of the multiprocessor. Similarly, spin-lock mechanisms require significant traffic between different processor cores. Still further, an atomic-add instruction requires that the shared variable be brought deep into processor cores to perform the add operation, again requiring significant traffic, as well as utilizing processor resources. Accordingly, a need exists for improved manners of synchronization between multiple threads.

DETAILED DESCRIPTION

In various embodiments, a shared memory variable ("shared variable") may be used to maintain synchronization between multiple threads. The shared variable may have multiple portions, with each portion being independently associated with one of the threads. In such manner, the shared variable may represent the synchronization status of each of the threads independently.

In some embodiments, the shared variable may be updated using a set mechanism, rather than an arithmetic operation, such as an increment or decrement operation. In such manner, the status of various threads may be updated without causing the shared variable to be cached or otherwise brought into a processor core. That is, set/reset operations may be performed in a remote or last level cache. Furthermore, these operations may be performed without expensive adders or other circuitry that would need to be located near an execution core.

In one embodiment, an instruction referred to herein as a fetchset instruction may be a low-cost instruction to improve MT synchronization, particularly in cases of low thread count. The fetchset instruction as executed by a given thread performs a read on a shared variable and sets or stores a predetermined value into a portion of the shared variable corresponding to the thread. For example, in an embodiment in which eight or fewer threads are executing, the shared variable may be eight bytes. Each byte of the shared variable may correspond to one of the threads. In one embodiment, the predetermined value to be set may be all "ones". For example, fetchset1 stores $FF_{hex}$ (i.e., 11111111) at the specified memory address of a given portion. Such an instruction may be low cost, since setting (i.e., overwriting) memory state is less expensive than performing read-add-update operations.

While discussed above as devoting a byte per thread, in other embodiments a different arrangement may exist. For example in one embodiment, a single bit may be used to represent a thread. Further, while described above as setting the predetermined value to ones, in other embodiments any other desired value may be used.

Figure 1:
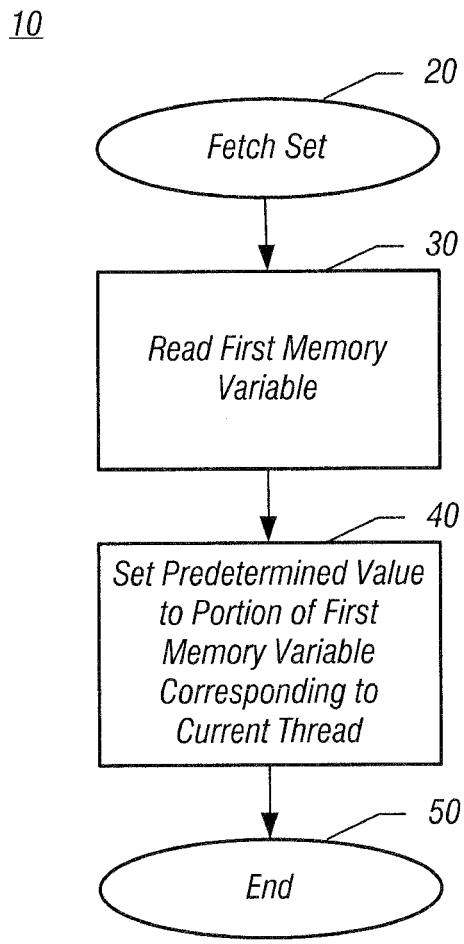
FIG. 1 is a flow diagram of a method in accordance with one embodiment of the present invention.

Referring now to FIG. 1, shown is a flow diagram of a method in accordance with one embodiment of the present invention. More specifically, FIG. 1 shows a method 10 for performing a fetchset instruction in accordance with one embodiment. Such a fetchset instruction may be used to access a shared memory variable and store a value in a portion of the variable corresponding to a given thread. As shown in FIG. 1, a fetchset operation may be initiated (oval 20). Then a first memory variable may be read (block 30). The first memory variable may correspond to a shared variable used to indicate synchronization status for multiple threads at a barrier. A thread may read the variable to determine whether all portions of the variable equal a given value, or to determine whether a particular portion of the variable is in a locked state, as will be discussed further below.

Still referring to FIG. 1, next a portion of the first memory variable corresponding to a current thread may be set with the predetermined value (block 40). For example, a first portion of the memory variable (e.g., a first byte) may correspond to a first thread of a program. Upon executing a fetchset instruction, the first thread may set that portion. In one embodiment, the portion may be set with all ones. Method 10 then ends (oval 50).

While not shown in FIG. 1, it is to be understood that upon arriving at the barrier, each thread performs a fetchset instruction on the variable, and the predetermined value is stored at the specified slot within the variable. Synchronization is established when all bytes of the memory variable are set.

Figure 2:
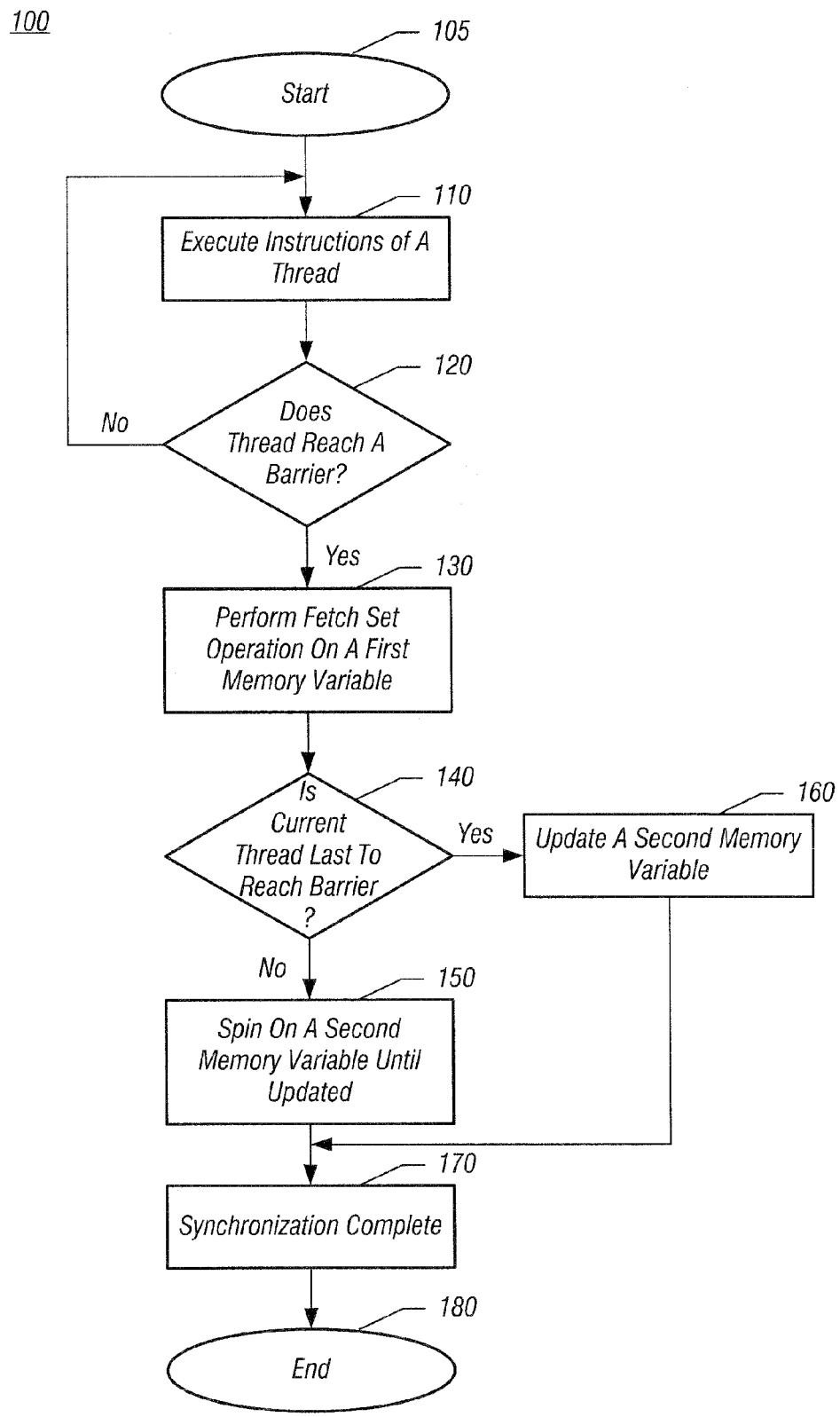
FIG. 2 is a flow diagram of a synchronization method in accordance with one embodiment of the present invention.

Referring now to FIG. 2, shown is a flow diagram of a synchronization method in accordance with one embodiment of the present invention. As shown in FIG. 2, method 100 may be used to synchronize multiple threads of a program. Method 100 begins (oval 105) by executing instructions of a given thread (block 110). Next it may be determined whether the thread reaches a barrier (diamond 120). For example, a barrier may correspond to a predetermined portion of the program at which synchronization is desired. If no such barrier is reached, the thread continues execution of instructions by looping back to block 110.

Alternately, if the thread does reach a barrier, control passes to block 130 where a fetchset operation is performed on a first memory variable. The first memory variable may be stored in a cache accessible by the multiple threads. Such a fetchset operation may include the steps described above with respect to FIG. 1. That is, the fetchset operation may cause the thread to read the contents of the first memory variable and set a value to a portion of the first memory variable corresponding to the current thread. Next, it may be determined whether the current thread is the last to reach the barrier (diamond 140). For example, in one embodiment the thread may read the variable contents and determine whether all portions equal a set value. However, in some embodiments the set value may be present in all portions of the first variable except that portion corresponding to the current thread. If the current thread is not the last to reach the barrier, control passes to block 150, where the thread spins on a second memory variable until it is updated. The second memory variable may also be stored in the cache.

If the current thread is the last to reach the barrier, the second memory variable may be updated (block 160). For example, the second memory variable may have its contents updated from zero to one. Control then passes to block 170, where the synchronization is completed, as all threads of the program have reached the barrier, and the contents of the first and second memory variables are set. Accordingly, method 100 concludes (oval 180).

Because of the low cost of implementing a fetchset instruction and as it may be defined on byte granularity, setting of the variable may be exported to a shared last level cache (LLC) of a CMP or other processor. In such manner, a cache line including the variable can be prevented from being copied into a core (near the execution pipeline) on every barrier update. Thus, inter-processor cache traffic in moving the lock variable across different cores may be avoided. Software may be used to ensure that the cache line remains pinned in the LLC by avoiding false sharing on the cache block and avoiding any other reads or updates to the memory variable (that would source a copy of the cache line into one of the core caches).

Other embodiments may be used to provide fine-grain locking using a single variable. For example, a 16-byte fetchset instruction may represent 16 fine-grain locks. In such an embodiment, a data structure containing 16 data elements can be locked using one shared variable. Each element of the data structure is allocated a byte within the lock variable. Then, only that portion of the structure may be locked using a fetchset instruction. In such manner, non-blocking access to the same structure is permitted, as long as the particular element to be accessed is not locked. If the original value returned by a fetchset operation to a first thread is clear in the particular byte location, then the first thread may successfully lock that element. If however the byte position was already set, the entry was previously locked by a different thread. Accordingly, the locking operation would need to be retried later by the first thread.

Figure 3:
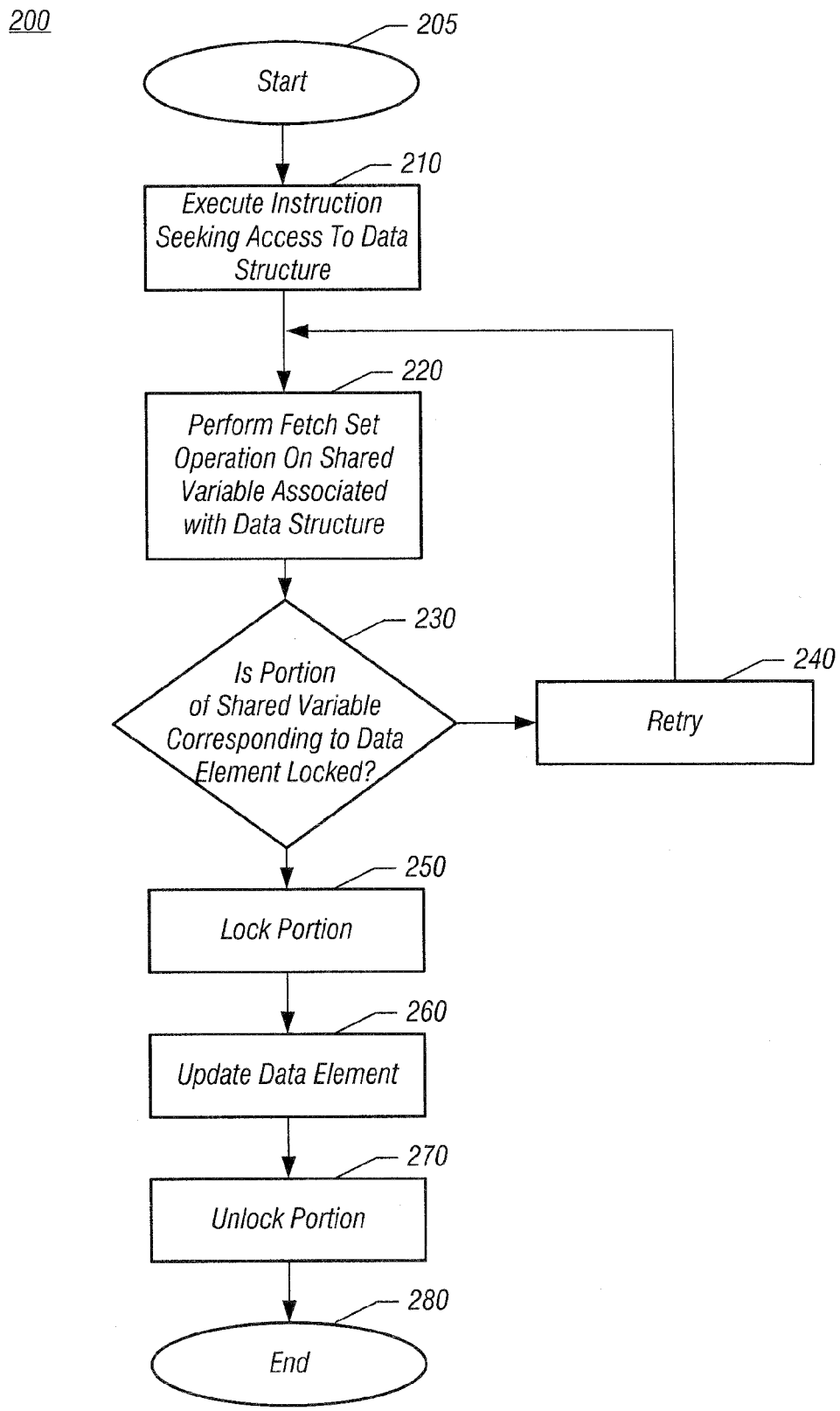
FIG. 3 is a flow diagram of a locking method in accordance with one embodiment of the present invention.

Referring now to FIG. 3, shown is a flow diagram of a locking method in accordance with one embodiment of the present invention. As shown in FIG. 3, method 200 may be used to lock a data structure using a plurality of fine-grain locks. Method 200 begins (oval 205) by an instruction that seeks access to a data structure that is subject to a lock (block 210). A fetchset operation, which may be similar to that shown in FIG. 1, may be performed on a shared variable associated with the data structure (block 220). However, for the embodiment of FIG. 3, block 40 of FIG. 1 may instead be used to set a predetermined value to a portion of the memory variable corresponding to a given data element of the data structure.

After reading the shared variable, it may be determined whether the portion of the variable corresponding to the data element is locked (diamond 230). For example, in one embodiment it may be determined whether that portion is set (i.e., has a value of ones). If the portion indicates that the data element is locked, the thread is not allowed to access the data element, and may accordingly retry the fetchset operation later (block 240). In such manner, if a different thread has concluded an operation on the data element, the next time the thread accesses the shared variable, the specific portion may be in a reset state.

If instead at diamond 230 it is determined that the portion of the shared variable is not locked, that portion may be locked (block 250). Then the current thread may update the data element that corresponds to that portion of the data structure (block 260). For example, the thread may update the data element and write the updated value back to its memory location. Then, the thread may unlock that portion of the shared variable (block 270) so that other threads may obtain a lock on the given data element. Accordingly, method 200 ends (oval 280).

In various embodiments, because a fetchset or other such instruction supports a predefined update payload (i.e., the predefined value), the payload may be synthesized at the particular cache executing the instruction. As a result, the update to the shared variable is protected against payload corruption through soft errors as the instruction flows through the machine.

Furthermore, because the synchronization status of each thread is isolated, it provides a robust barrier synchronization mechanism. Any thread that fails to report to the barrier does not have its byte location set in the shared variable. In such manner, any errant thread resulting in a software failure (either due to software or hardware error) may be isolated and identified based on the status of the shared variable. Software may then selectively perform recovery on the particular thread.

A 16 byte variant of the fetchset instruction (i.e., a fetchset.double) may be defined to operate on a 16 byte granularity, and thus provide synchronization among 16 threads.

In some embodiments, a hierarchical barrier mechanism may be used to establish synchronization in software with large thread counts. In such embodiments, a fetchset-based mechanism may serve as an effective barrier mechanism at a lower level of the hierarchy to establish synchronization within a CMP processor or within a local cluster of a clustered system.

Referring now to Table 1 below, shown is an instruction syntax for a fetchset instruction in accordance with an embodiment of the present invention. As shown in Table 1, the instruction syntax is within the scope of the IPF ISA.

TABLE 1

| | fetchset.dbl.pl.sz.sem r1, [ar.csd] = [r3] |
|---|---|
| dbl: | s-8byte read |
| | d-16byte read. Second 8 byte target ar.csd. |
| pl: | 0-clear ('0 payload) |
| | 1-set ('1111 . . . payload) |
| sz: | 0-1 byte |
| | 1-2 byte |
| | 2-4 byte |
| | 3-8 byte |
| | 4-16 byte (only valid with dbl set to d). |
| sem: | acq-acquire |
| | rel-release. |

Note:
ar.csd only applies when dbl is set to d)

As shown in Table 1, the instruction syntax indicates: whether an 8 byte or 16 byte read operation is to be performed; the payload to be written into the specified location; the size; and the type of semaphore, for example, whether it is an acquire or release operation.

Referring now to Table 2 below, shown is a pseudocode example of establishing a barrier synchronization using a fetchset instruction in accordance with an embodiment of the present invention. Again, this pseudocode is in the IPF context, although the scope of the present invention is not so limited.

TABLE 2

```
//r20 contains the barrier address.
//r40 contains the shared memory variable.
            stf.spill [r20] = f0
            stf.spill [r40] = f0
            //note: these lines write a 16-byte zero value into the
            target registers
            mov r30 = 'hFFFFFFFFFFFFFFFF;;
            mov ar.csd = r30;;
            //note: this line moves the second operand for the fetchset
    operation into the target register
// Start independent thread-level execution.
    .
    .
    .
// Complete thread execution
            fetchset.d.1.rel r10, ar.csd = [r20], 0;;
            cmp.eq p1, p2 = r10, r30
            //note: if the register values are equal, p1 is set to one
        and p2 is set to zero, otherwise vice versa
            mov r35 = ar.csd;;
            cmp.eq.and p1, p2 = r10, r35;;
            p1: stf.spill [r40] = f1;;
            p1: br sync_cmp
            //note: if p1 equals one, operation branches to sync_cmp
        (i.e., synchronization is complete)
spin_loop:  ldff19 = [r40]
            fcmp.eq p1, p2 = f19, f1;
            //note: if target values are equal, p1 equals zero and p2
            equals
        one and operation branches to sync_cmp (i.e., synchronization is
        complete), otherwise vice versa and spin_loop is repeated
            p2: br spin_loop
sync_cmp:   //synchronization completed.
```

Generally, the code of Table 2 performs the following activities. First, the code initializes the location in the cache where the shared variable is to be stored and further initializes the shared variable to zero. Then, independent threads are executed. Upon completion of a thread, a fetchset instruction is performed by each thread to read the value of the shared variable and compare it to a predetermined value. If the shared variable equals that value, it means that the current thread is the last thread, and synchronization is completed. If not, the current thread updates its portion of the shared variable, and enters a spin loop until the last thread completes its execution to thus complete synchronization.

Figure 4:
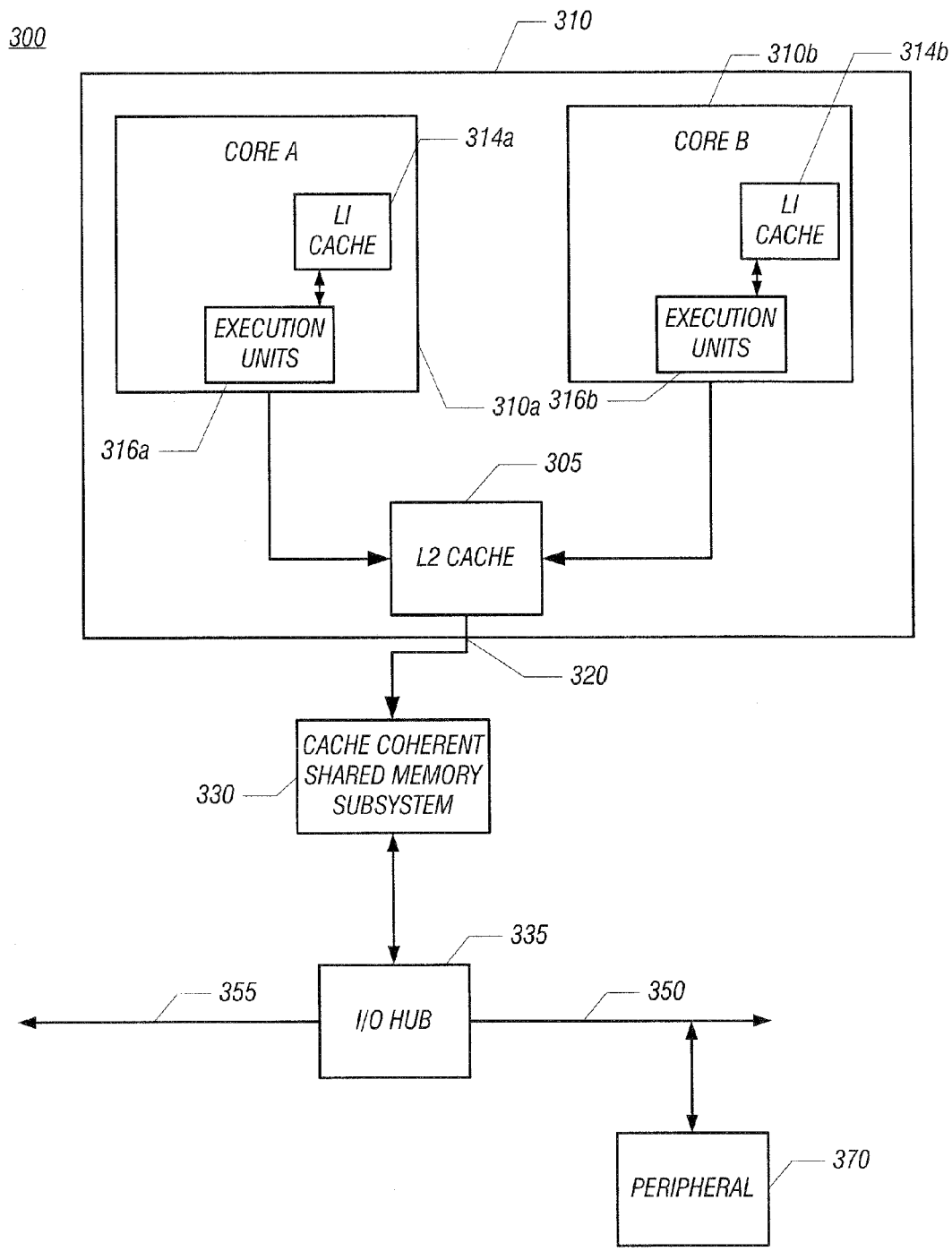
FIG. 4 is a block diagram of a representative system in accordance with one embodiment of the invention.

Referring now to FIG. 4, shown is a block diagram of a representative computer system 300 in accordance with one embodiment of the invention. As shown in FIG. 4, computer system 300 includes a processor 310 which may be a chip multiprocessor (CMP). As shown in FIG. 4, processor 310 may include a first core 310*a* (core A) and a second core 310*b* (core B). Processor 310 may be coupled over a memory system interconnect 320 to a cache coherent shared memory subsystem ("coherent memory") 330 in one embodiment. In one embodiment, coherent memory 330 may include a dynamic random access memory (DRAM) and may further include coherent memory controller logic to share coherent memory 330 between multiple processors.

It is to be understood that in other embodiments additional processors may be coupled to coherent memory 330. Furthermore in certain embodiments, coherent memory 330 may be implemented in parts and spread out such that a subset of processors within system 300 communicate to some portions of coherent memory 330 and other processors communicate to other portions of coherent memory 330.

As shown in FIG. 4, core 310*a* may include a cache 314*a* and execution units 316*a* in accordance with an embodiment of the present invention. Cache 314*a* may be a low level cache (e.g., a level one (L1)) associated with core 310*a*. Of course, additional components may reside in core 310*a*, such as additional caches. More so, a last level cache (LLC) 305, which may be a level two (L2) cache, may be coupled to both cores 310a and 310b. LLC 305 may store a lock variable in accordance with an embodiment of the present invention. Furthermore, the value to be set into portions of the lock variable may be synthesized in LLC 305. As further shown in FIG. 4, similar processor components may be present in core 310b, which may be a second processor core of a multiprocessor system such as a chip multiprocessor (CMP).

Coherent memory 330 may also be coupled (via a hub link) to an input/output (I/O) hub 335 that is coupled to an I/O expansion bus 355 and a peripheral bus 350. In various embodiments, I/O expansion bus 355 may be coupled to various I/O devices such as a keyboard and mouse, among other devices. Peripheral bus 350 may be coupled to various components such as peripheral device 370 which may be a memory device such as a flash memory, add-in card, or the like. Although the description makes reference to specific components of system 300, numerous modifications of the illustrated embodiments may be possible.

Figure 5:
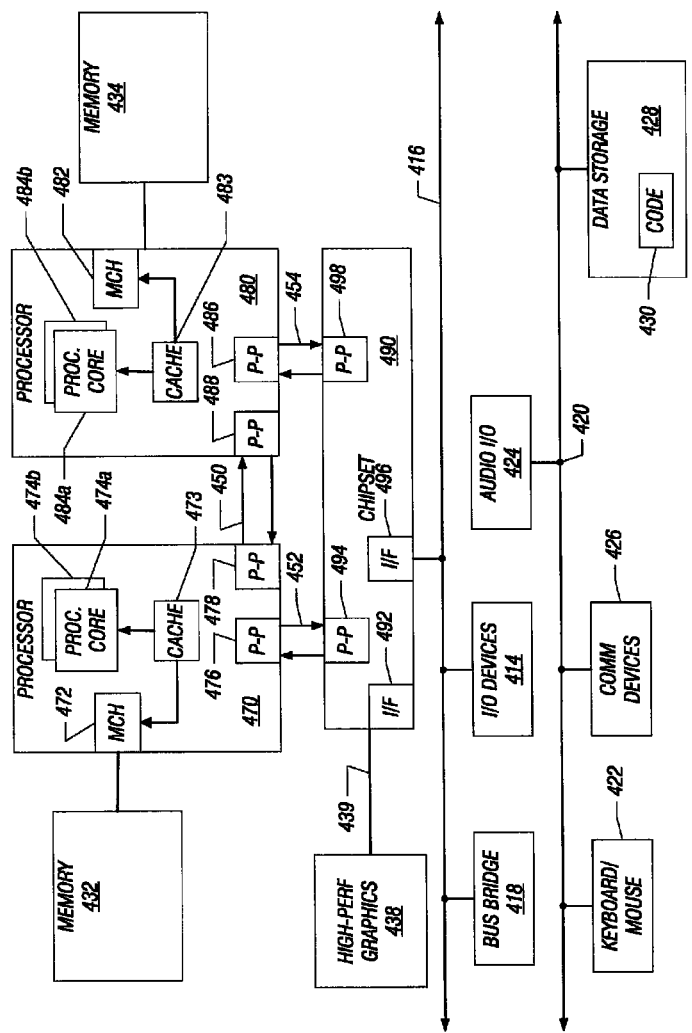
FIG. 5 is a block diagram of a multiprocessor system in accordance with another embodiment of the invention.

In some embodiments, a multiprocessor system may be a point-to-point bus system, such as in a common system interface (CSI) system. Referring now to FIG. 5, shown is a block diagram of a multiprocessor system in accordance with another embodiment of the present invention. As shown in FIG. 5, the multiprocessor system is a point-to-point bus system, and includes a first processor 470 and a second processor 480 coupled via a point-to-point interconnect 450. First processor 470 may include multiple processor cores 474a and 474b (although more such cores may be present), a memory controller hub (MCH) 472, a cache memory 473, and point-to-point (P-P) interfaces 476 and 478. Similarly, second processor 480 includes the same components, namely processor cores 484a and 484b, a MCH 482, a cache memory 483, and P-P interfaces 486 and 488. Caches 473 and 483 may store lock variables in accordance with an embodiment of the present invention. Furthermore, values to be set into portions of the lock variables may be synthesized in caches 473 and 483.

As shown in FIG. 5, MCH's 472 and 482 couple the processors to respective memories, namely a memory 432 and a memory 444, which may be portions of main memory locally attached to the respective processors.

First processor 470 and second processor 480 may be coupled to a chipset 490 via P-P interfaces 452 and 454, respectively. As shown in FIG. 5, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation I/O interconnect bus, although the scope of the present invention is not so limited.

As shown in FIG. 5, various input/output (I/O) devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include, in one embodiment code 430. Further, an audio I/O 424 may be coupled to second bus 420.

Embodiments may be implemented in a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first processor core;
a second processor core coupled to the first processor core;
a shared cache coupled to the first processor core and the second processor core to store a plurality of thread synchronization variables; and
logic, responsive to a fetchset instruction comprising a single instruction of an instruction set architecture, to overwrite a thread synchronization variable stored in the shared cache while a cache line including the plurality of thread synchronization variables is prevented from being copied into either of the first and second processor cores when a corresponding one of a plurality of threads reaches a barrier, wherein each of the plurality of thread synchronization variables is to indicate a synchronization status for one of the plurality of threads at the barrier.

2. The processor of claim 1, wherein the logic is to read the shared cache to determine whether the plurality of thread synchronization variables are equal to a first value.

3. The processor of claim 1, wherein the fetchset instruction is to be performed without an increment or decrement operation.

4. The processor of claim 1, wherein the first processor core and the second processor core comprise a chip multiprocessor and the shared cache comprises a last level cache.

5. The processor of claim 1, wherein the shared cache is to store a shared memory structure having multiple locations, wherein each of the multiple locations corresponds to one of a plurality of data elements of a data structure.

6. The processor of claim 5, wherein a thread is prevented from access to one of the plurality of data elements if the corresponding location of the shared memory structure is indicative of a locked state.

7. A non-transitory machine-readable medium having stored thereon instructions, which if performed by a machine cause the machine to perform a method comprising:
receiving a single instruction of an instruction set architecture in a first processor, wherein the single instruction comprises a fetchset instruction;

responsive to the single instruction, reading a shared variable having a location for each of multiple threads, the shared variable stored in a shared last level cache coupled to the first processor and a second processor; and further responsive to the single instruction, writing a value to a corresponding location within the shared variable assigned to a first thread to indicate that the first thread reached a barrier while a cache line including the shared variable is prevented from being copied into either of the first and second processors, the shared variable to indicate a synchronization status for the multiple threads at the barrier and each location within the shared variable readable by all of the multiple threads but only writable by one of the multiple threads.

8. The non-transitory machine-readable medium of claim 7, wherein the method further comprises:

assigning one of a plurality of locations within the shared variable to each of the multiple threads; and updating a second memory variable if the first thread is the last of the multiple threads to reach the barrier.

9. A processor comprising:

a first processor core;

a second processor core; and a last level cache memory coupled to the first and second processor cores, wherein the last level cache memory is to store a first shared variable including a plurality of portions each corresponding to a thread of a plurality of threads, wherein the first processor core is to perform a single fetchset instruction of a first instruction set architecture to overwrite a first portion of the first shared variable while a cache line including the first shared variable is prevented from being copied into either of the first and second processor cores when a corresponding one of the plurality of threads reaches a barrier.

10. The processor of claim 9, wherein the first thread is to:

determine if the first portion of the first shared variable corresponding to a first data element of a data structure is of a first value; and if not, write the first value to the first portion of the first shared variable and update the first data element.

11. The processor of claim 10, wherein the first processor core is prevented from access to the first data element of the data structure if it is determined that the value read from the first portion is of the first value.

12. The processor of claim 10, wherein the first processor core is to write the first value to the first portion of the first shared variable by a second thread.

13. The processor of claim 12, wherein the first value is to lock the first data element for the second thread.

* * * * *